(12) United States Patent
Bellis, Jr.

(10) Patent No.: US 6,382,891 B1
(45) Date of Patent: May 7, 2002

(54) TIE DOWN

(76) Inventor: William B. Bellis, Jr., 1401 Schuff La., Louisville, KY (US) 40205

( * ) Notice: Subject to any disclaimer, the term of this patent is extended or adjusted under 35 U.S.C. 154(b) by 0 days.

(21) Appl. No.: 09/841,452

(22) Filed: Apr. 24, 2001

(51) Int. Cl.[7] .................................................. B60P 7/08
(52) U.S. Cl. ...................... 410/7; 410/3; 410/4
(58) Field of Search ...................... 410/2, 3, 4, 7, 410/9, 19, 22; 248/500, 503

(56) References Cited

U.S. PATENT DOCUMENTS

| | | | | |
|---|---|---|---|---|
| 1,557,449 A | * | 10/1925 | Fennell | 410/22 |
| 3,730,552 A | * | 5/1973 | Clark | 410/3 |
| 4,580,935 A | * | 4/1986 | Treihaft | 410/3 |
| 5,503,449 A | * | 4/1996 | Cameron et al. | 410/19 X |
| 5,795,115 A | * | 8/1998 | Collins | 410/22 |
| 5,823,723 A | * | 10/1998 | Finch | 410/22 |
| 6,036,417 A | * | 3/2000 | Weaver | 410/7 |
| 6,077,004 A | * | 6/2000 | Denman, Jr. | 410/7 X |

* cited by examiner

Primary Examiner—Stephen T. Gordon
(74) Attorney, Agent, or Firm—Theresa Fritz Camoriano; Camoriano and Associates

(57) ABSTRACT

A tie down device for securing equipment such as lawn mowers, snow blowers, and generators to the deck of a trailer comprises a retractable arm which hangs under the trailer deck when not in use but which may be extended above the deck in order latch onto a mating projection on the equipment to be secured.

6 Claims, 3 Drawing Sheets

TIE DOWN

BACKGROUND OF THE INVENTION

The present invention relates to a tie down device to secure items to a deck. More particularly, it relates to a device which will secure equipment such as lawn mowers, garden tractors, snow blowers, and construction equipment to a trailer deck to secure such equipment for transport.

Landscape contractors, builders, snow removal contractors, and even home owners have a need to transport equipment to and from a job site. This transport of equipment is generally accomplished using a trailer, and it is preferred to secure the equipment to the trailer so it will not move around or fall off during transit. There is a need for a simple mechanism to safely and quickly secure the equipment to the trailer. Preferably, this mechanism should be inexpensive, easy to install, and easy to use. It should not be in the way when loading or unloading the equipment onto the trailer, and it should also offer the possibility of not only tying down but also of locking down the equipment to the trailer so that the equipment may not be readily stolen.

SUMMARY OF THE INVENTION

The present invention provides a tie down device to secure equipment to a trailer deck. A preferred embodiment of the present invention has two main parts—a retractable tie down arm, which is secured to the trailer deck, and an equipment connector, which is secured to the equipment to be tied down (by welding, bolting, riveting, or some other suitable means). In the preferred embodiment, the tie down arm has a receiving nose with an opening that is sized to receive a projection from the equipment connector.

To secure the equipment to the trailer, the equipment is placed on the trailer so that the equipment connector is next to the tie down arm (which at this point is still mostly retracted under the trailer deck). The tie down arm is then pulled up, and the opening on the nose of the arm is slid over a projection on the equipment connector. A locking pin is inserted through a hole in the projection to fasten the projection and arm together. The locking pin may be replaced by a padlock or other lock in order to lock down the equipment to the trailer.

DESCRIPTION OF THE PREFERRED EMBODIMENT

Figure 1:
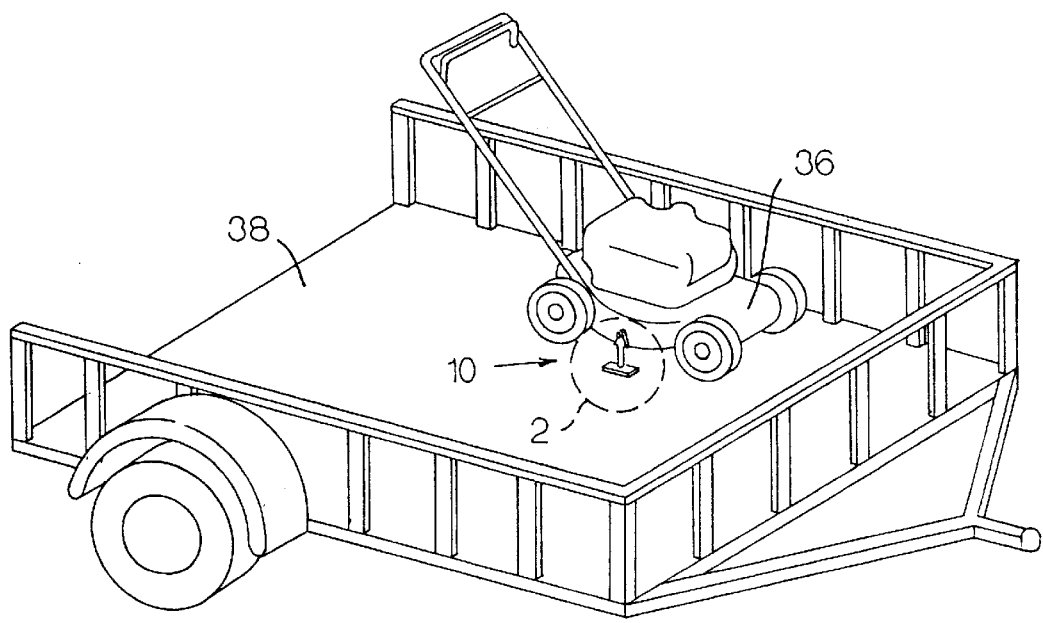
FIG. 1 is a perspective view of a trailer on which is secured a lawn mower using a tie down device made in accordance with the present invention.
Figure 2:
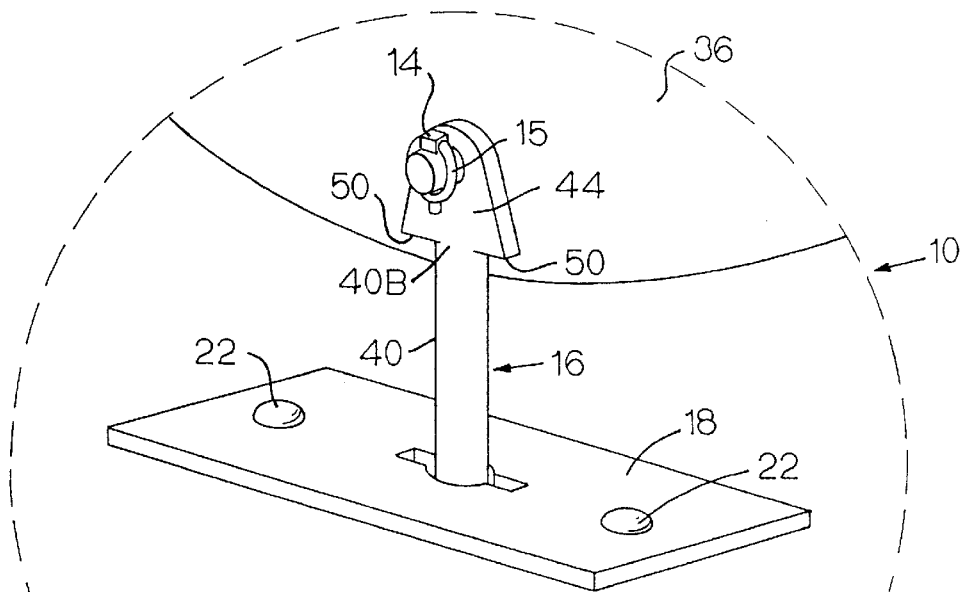
FIG. 2 is an enlarged view of the tie down device of FIG. 1.
Figure 3:
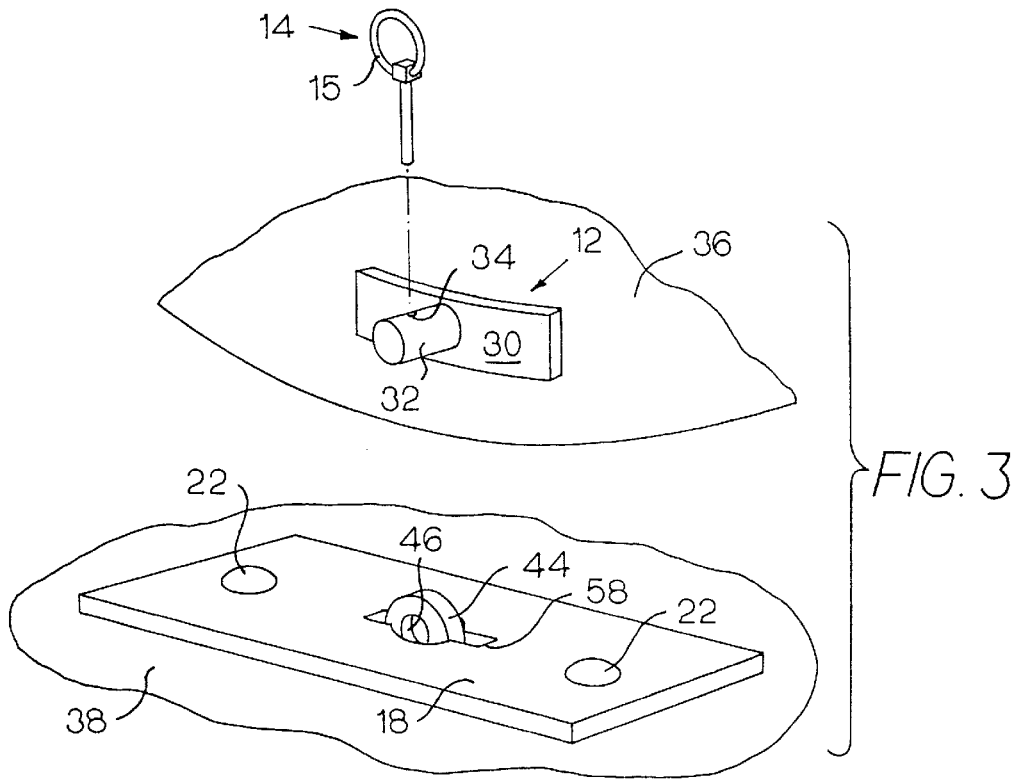
FIG. 3 is the same view as FIG. 2, except that the tie down arm has been released from the equipment connector, and the arm is retracted to be almost flush with the trailer deck.
Figure 6:
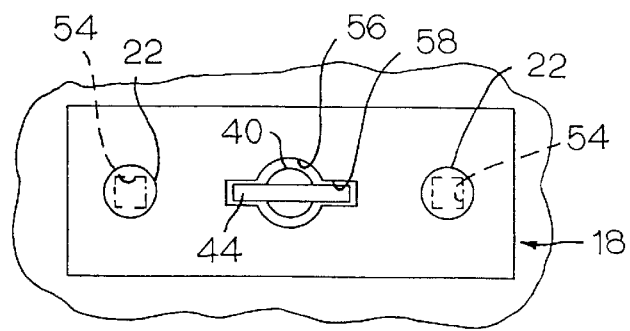
FIG. 6 is a view along line 6—6 of FIG. 5.
Figure 7:
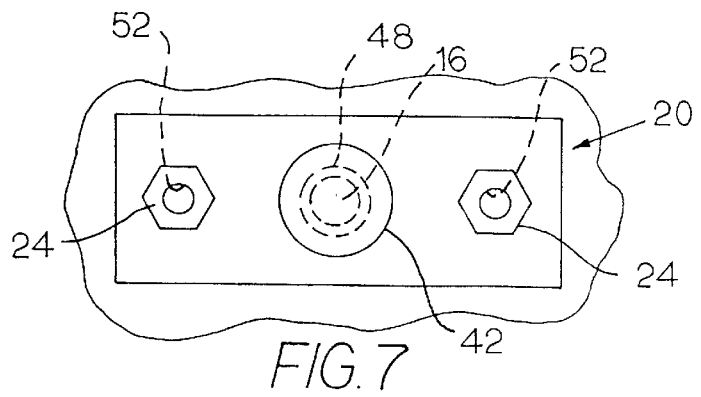
FIG. 7 is a view along line 7—7 of FIG. 5.
Figure 4:
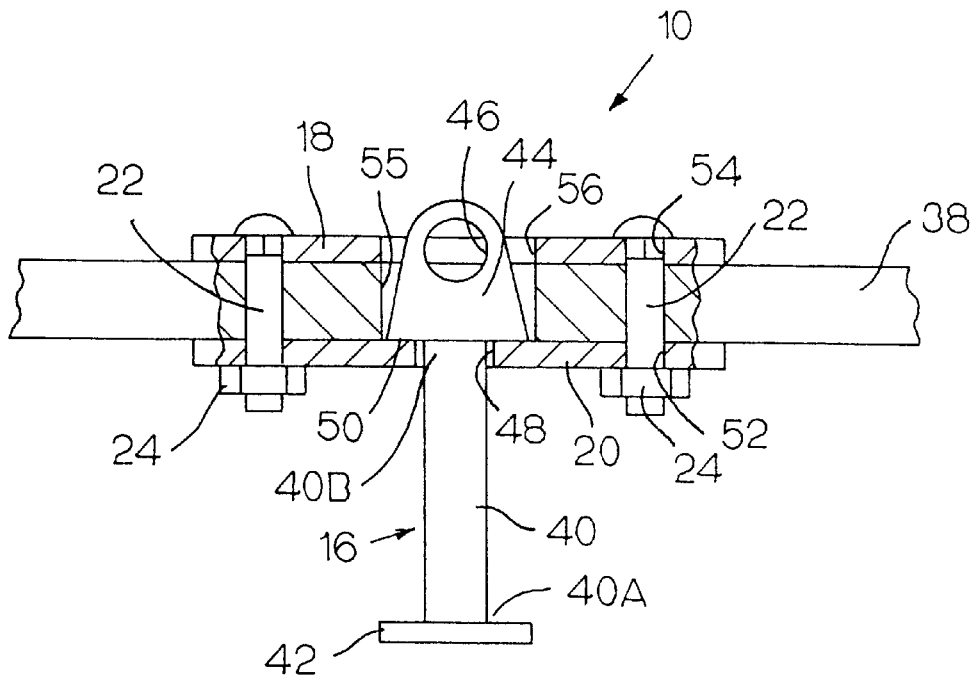
FIG. 4 is a broken away side view, partially in section, of the tie down arm in the retracted position, almost flush with the trailer deck as shown in FIG. 3.
Figure 5:
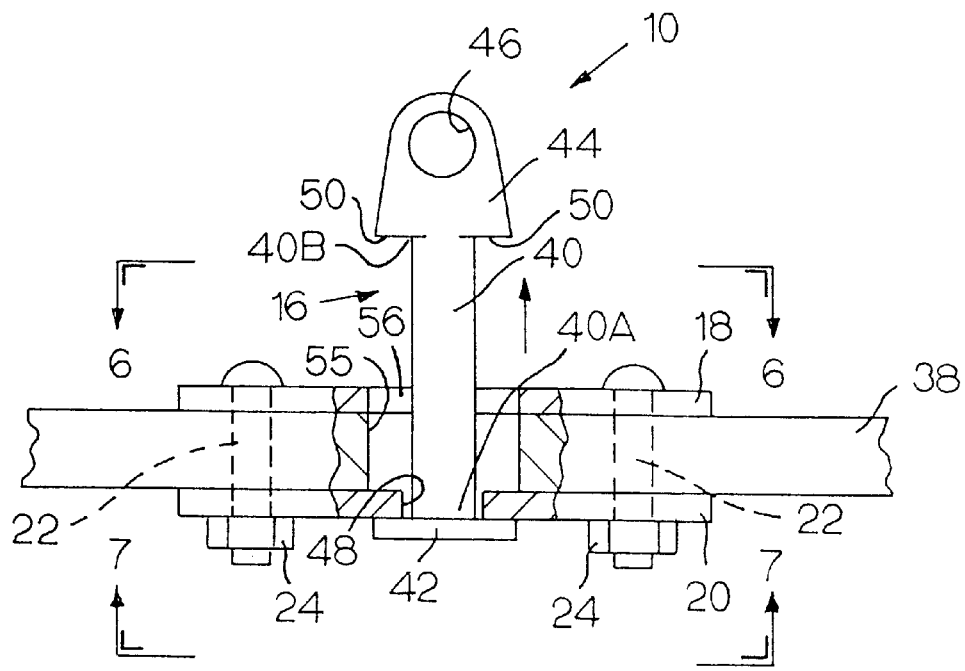
FIG. 5 is the same view as FIG. 4, except that the tie down arm is in the fully extended position as shown in FIG. 2.

FIGS. 1–7 show a preferred embodiment of a tie down device 10 made in accordance with the present invention. This preferred embodiment includes nine pieces: an equipment connector 12, a locking pin 14, a tie down arm 16, an upper mounting plate 18, a lower mounting plate 20, and two carriage bolts 22 with corresponding nuts 24.

In this preferred embodiment, the equipment connector 12 is made up of a flat, rectangular piece of steel 30 (See FIG. 3) onto which is welded a horizontally-oriented cylindrical projection 32 sized to be received in a circular opening 46 in the nose 44 of the tie down arm 16, as will be explained later. The projection 32 has a vertical opening 34 which extends through the projection 32 and receives a locking pin 14. The locking pin 14 in this preferred embodiment includes a pivot ring 15, which is swivelled down around the projection 32 to secure the locking pin 14 to the projection 32. The tie down plate 30 is secured to the equipment 36 to be tied down to the trailer 38 by any suitable means such as by bolting, welding, or riveting, and is secured to the equipment 36 at a height which will allow the tie down arm 16 to engage the projection 32 when the tie down arm 16 is fully extended, as will be explained in further detail later.

The tie down arm 16 includes a shaft 40 having first and second ends 40A and 40B. A flange 42 is secured to said first end 40A, and the maximum diameter of the flange 42 is larger than the diameter of the shaft 40 and larger than the opening 48 in the lower mounting plate 20, as will be explained later. A flat, nose-like projection 44 is secured to said second end 40B, and this projection 44 has an opening 46 with a inside diameter which is larger than the diameter of the horizontally-oriented cylindrical projection 32 on the equipment connector 12, so that the opening 46 can easily slide over the cylindrical projection 32. The nose-like projection 44 of the tie-down arm 16 is flat but is wider than the cylinder 40 to which it is secured, and it defines two shoulders 50 projecting outwardly from the cylinder 40.

The lower mounting plate 20 (See FIGS. 4, 5, and 7) preferably is a flat, rectangular piece of steel which has a circular central opening 48 and two square side openings 52. The central opening 48 has a diameter larger than the diameter of the shaft 40 of the tie down arm, smaller than the diameter of the flange 42 which is secured to the first end 40A of the tie down arm 16, and smaller than the maximum width of the nose portion 44 of the tie-down arm 16. Since the two ends of the tie-down arm 16 are larger than the diameter of the central opening 48 in the lower mounting plate, the tie-down arm 16 and lower mounting plate 20 cannot be separated from each other except by cutting or deforming one of the members.

The upper mounting plate 18 (See FIGS. 4–6) preferably is a flat, rectangular piece of steel, identical to the lower mounting plate 20, except that the central opening 56 of the upper plate 18, which corresponds to the central opening 48 in the lower mounting plate 20, defines an additional rectangular slot or keyway 58, sized to receive the shoulders 50 of the flat, nose-like projection 44. When the nose 44 of the tie-down arm 16 drops down through the slot 58, it falls until the shoulders 50 abut the lower mounting plate 20. At this point, only the uppermost portion of the nose projection 44 projects up through the upper mounting plate 18. (See FIG. 4.) Thus, in this preferred embodiment, the nose portion 44 has a height that is slightly greater than the combined thickness of the deck and the upper mounting plate 18 in order that the nose projection 44 will project slightly above the upper mounting plate 18 when it is retracted. Most decks are made of 2×4-inch lumber, so the height of the nose projection 44 in this preferred embodiment is about 2–¼ to 2–½ inches. If the deck is thinner, then spacers can be provided to mount between the bottom surface of the deck and the lower mounting plate 20. These spacers may be identical to the upper mounting plate 18, or they may just be a stack of washers mounted over the carriage bolts.

When the mounting arrangement is being constructed, the shaft 40 of the tie-down arm 16 is inserted through the opening 48 in the lower mounting plate 20 before the last of the flange 42 and nose 44 is welded onto the shaft 40, so the lower mounting plate 20 is trapped onto the tie down arm 16. (While the flange and nose preferably are welded onto the shaft 40, they may also be bolted on or secured by other known means.) The mounting parts usually would be supplied to the customer as a kit, which the customer would then use to install the mounting arrangement on a deck, so the customer would receive a kit including the tie-down arm 16 with the lower mounting plate 20 trapped onto the arm 16, and then loose parts including the upper mounting plate 18, the carriage bolts 22 and nuts 24, the equipment connector 12, and the locking pin 14.

The customer would then assemble the mounting arrangement onto his deck. First, a central hole 55 is drilled through the deck 38 to a diameter that is at least as large as the width of the nose 44. Next, two side holes are drilled through the deck to receive the carriage bolts 22. Then, the nose 44 of the tie-down arm is inserted from beneath the deck through the central hole 55 in the deck, the upper mounting plate 18 is placed on top of the deck and aligned with the drilled holes, and the upper and lower mounting plates 18, 20 are fastened together, with the deck sandwiched between them, by means of the carriage bolts 22, which extend through the holes 54 in the upper plate 18, through holes in the deck, and through holes 52 in the lower plate 20, and are secured with nuts 24. The central holes 56 and 48 of the upper and lower mounting plates 18, 20 and the side holes 54, 52 are aligned.

The installed tie down arm 16 is then free to move upwardly until the lower flange 42 of the tie-down arm 16 hits against the bottom surface of the mounting plate 20. Also, the tie down arm 16 is free to move downwardly until the shoulders 50 hit against the top of the lower mounting plate 20. Thus, the lower mounting plate 20 acts as a stop to control how far up and down the tie down arm 16 may move. (See FIG. 5 for the extended position and FIG. 4 for the retracted position.)

Then, the equipment 36 is loaded onto the deck 38 and placed in its intended location. The tie down arm 16 is lifted up, the projection 32 on the equipment is inserted through the opening 46 on the nose-like projection 44 of the tie down arm 16, and the flat steel plate 30 of the equipment connector 12 is then bolted or otherwise secured to the equipment 36.

Once the tie down device 10 has been installed, it is quick, easy, and safe to use. To secure the equipment 36 to the trailer 38, the operator loads the equipment 36 to the designated location on the trailer, and lifts up the tie down arm 16. The operator then slides the opening 46 of the nose-like projection 44 of the tie-down arm 16 over the cylindrical projection 32 secured to the equipment 36. Then, the operator secures the tie down arm 16 to the tie down projection 12 by means of the locking pin 14. The operator may alternatively choose to insert a padlock (not shown) in place of the locking pin 14 in order to help prevent theft of the equipment 36. To remove the equipment 36 from the trailer 38, the operator simply reverses the aforementioned steps.

The central holes 56, 48 in the upper and lower mounting plates 18, 20 are slightly oversized relative to the diameter of the shaft 40. This gives the device 10 enough play to make it easy to mount the equipment 36. However, there is enough rigidity to the device 10 that it secures the equipment on the deck and prevents the equipment from rolling around on the trailer deck as the trailer is pulled down the road. Of course, while this device 10 is shown being used on a trailer deck, it may be used on other decks as well.

This tie down device 10 greatly speeds up and simplifies the tie down and removal of equipment from a trailer, and, by automatically retracting, this tie down device 10 limits the opportunity for the operator to trip over it when walking around on the deck.

While this preferred embodiment has a projection secured to the equipment which fits through an opening in the tie down arm, it would also be possible in an alternative embodiment to have an opening on the equipment connector and the projection on the tie down arm, with the tie down arm projection extending through the opening on the equipment connector.

It will be obvious to those skilled in the art that other modifications may be made to the embodiment described above without departing from the scope of the present invention.

What is claimed is:

1. A tie down device to secure equipment to a deck, comprising:

an equipment connector adapted to be secured to the equipment to be tied down;

upper and lower mounting plates, each of said mounting plates defining a central opening and left and right openings, wherein the central opening of said upper mounting plate further defines a slot; and a tie down arm having a central shaft with a first diameter smaller than the central openings of said upper and lower mounting plates and defining first and second ends; a nose secured to said first end, said nose having a width in one direction that is larger than the diameter of the central opening of said lower mounting plate, wherein said nose is sized to slide through the central opening and slot of said upper mounting plate; and a flange secured to said second end, said flange being larger than the central opening of said lower mounting plate; and a cooperating projection on one of said equipment connector and said nose and a cooperating opening on the other of said equipment connector and said nose which receives said cooperating projection.

2. A tie down device as recited in claim 1, wherein said equipment connector includes an equipment connector plate and said cooperating projection projecting from said equipment connector plate.

3. A tie down device as recited in claim 2, wherein said cooperating projection further defines a hole for receiving a lock.

4. A tie down device for securing equipment to a deck, comprising:

a plate to be secured to said equipment, said plate including a projection;

a retractable arm having a central shaft and enlarged first and second ends, said second end defining an opening which receives said projection when said retractable arm is in a fully extended position;

a lower mounting plate mountable under said deck, said lower mounting plate defining a first hole through which said retractable arm travels in a generally vertical direction, wherein said enlarged first and second ends of said arm are larger than said first hole; and an upper mounting plate mountable on top of said deck, said upper mounting plate defining a second hole through which said retractable arm travels in a generally vertical direction, said second hole being large enough that said second end of said retractable arm may pass through it; with said first hole on said lower mounting plate vertically aligned with said second hole in said upper mounting plate.

5. A tie down device as recited in claim 4, wherein said projection further defines a locking hole for receiving a locking pin.

6. A tie down device as recited in claim 5, and further comprising a locking pin received in said locking hole, said locking pin further including a pivot ring which encircles said projection.

* * * * *